Jan. 1, 1929.  W. S. GREEN  1,697,276
HOLDING APPLIANCE FOR BORING MACHINES
Filed Sept. 24, 1924

Inventor:
William Stanley Green
By: Munday, Clarke
& Carpenter Attys

Patented Jan. 1, 1929.

1,697,276

UNITED STATES PATENT OFFICE.

WILLIAM STANLEY GREEN, OF HOOPESTON, ILLINOIS.

HOLDING APPLIANCE FOR BORING MACHINES.

Application filed September 24, 1924. Serial No. 739,467.

My present invention relates to machines for boring rebabbitted bearings of connecting rods for internal combustion engines, and has for its primary object the provision of a rod clamping device which is easily and simply applied and comprises engaging members under spring tension adapted to conform accurately to the perhaps irregular edges of the connecting rod so that the latter may be clamped in exact relationship with respect to the boring tool, the engaging members being thereafter rigidly fixed in the position assumed so that the rod may be firmly held against lateral movement or weaving during the boring operation.

Numerous other objects and advantages of the invention will be apparent as it is better understood from the following description, which, taken in connection with the accompanying drawings, discloses a preferred embodiment thereof.

Referring to the drawings.

Figure 1:
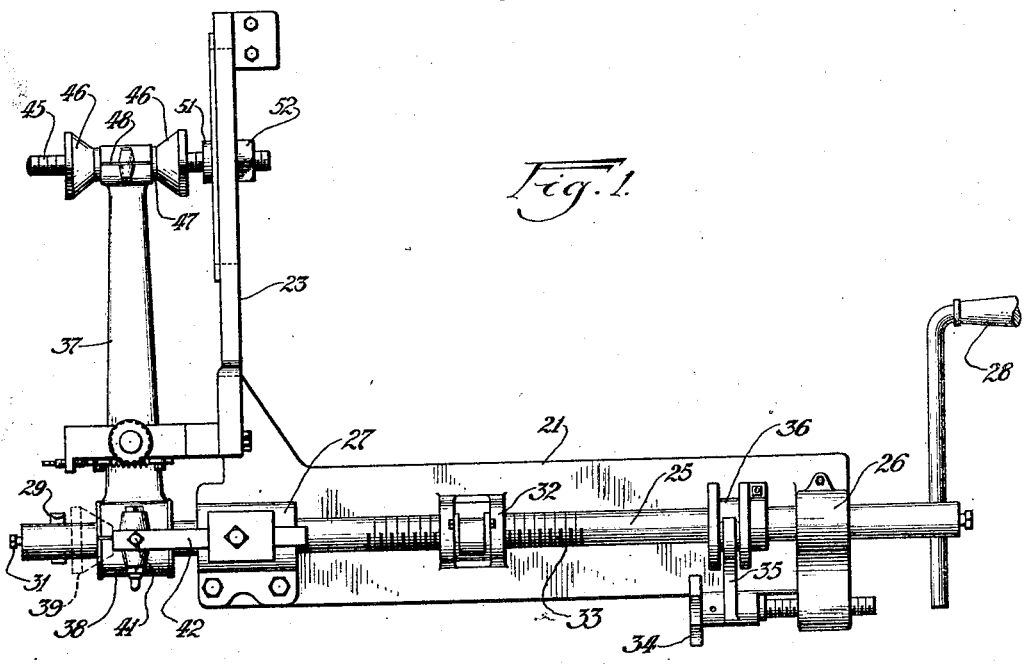
Figure 1 is a top plan view of a boring machine to which a device embodying my invention is applied.
Figure 2:
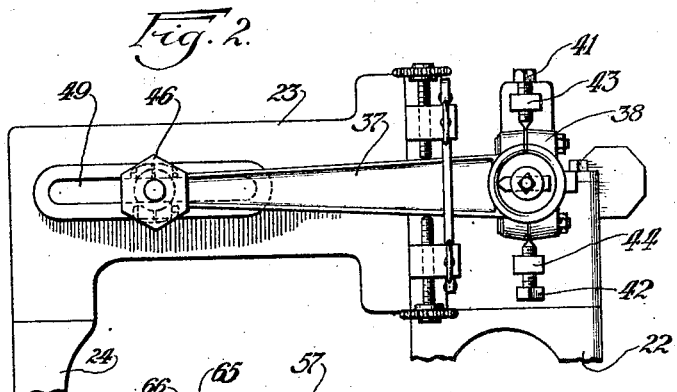
Fig. 2 is a partial end elevation thereof.

The apparatus shown in the drawings for purposes of illustration, comprises a main frame 21, supported upon legs 22 and having a rearwardly extending bracket 23 at one end thereof, supported by a leg 24. A boring bar, or rod 25 is mounted in bearings 26 and 27 on the main frame 21 and is adapted to be rotated by means of a crank handle 28 to operate a boring tool 29, secured in the opposite end of said bar by means of a set screw 31. For the purpose of moving said bar longitudinally during the boring operation, I employ a feed nut 32, cooperating with threads 33 on the bar, said nut being releasably engageable with said bar, by means of a construction not here shown in detail, in order that the tool may be used for scraping the ends of the bearings, being adjustable in the latter operation by means of a manually operable feed screw 34, having a laterally extending yoke 35, engaging in a slotted collar 36 on said bar.

The connecting rod 37 is adapted to be supported at the end of the machine shown at the left in Fig. 1 and means are provided both for centering the bearing portion of said rod with reference to the boring bar 25 and for holding the rod immovably in centered position during the boring operation. For the purpose of centering the bearing portion 38 of said rod, I employ a cone 39, slidable upon the rod 25 and adapted to enter the bearing to space it with reference to the center of the bar. Clamping screws 41 and 42, extending through adjustable supporting bars 43 and 44, may be employed to clamp the head of the connecting rod after the latter has been centered, and I employ a device comprising a bolt 45, having conical nuts 46 threaded thereon, adapted to enter the bronze bushing 47 in the wrist pin bearing 48 of the connecting rod, said bolt being adjustably supported in the bracket 23 in a slot 49 by means of a collar 51 and a nut 52.

Figure 3:
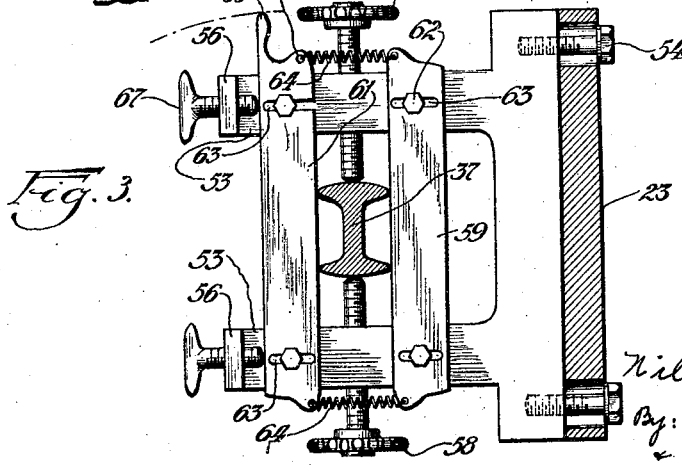
Fig. 3 is an enlarged elevational view of the clamping device embodying the invention.

The holding appliance provided by my invention comprises a bracket 53, attachable to the frame of the machine by means of screws 54 and comprising laterally protruding arms 55, which are flanged at their forward ends, as indicated at 56 and have clamping screws 57 and 58 extending vertically therethrough. Two bars 59 and 61 are adapted to be secured to the bracket arms 53 by means of set screws 62, extending through slots 63 at the upper and lower ends of said bars 59 and threaded into said arms 53. The bars are connected by means of springs 64, which preferably have their ends merely hooked in apertures 65 and are easily removable from engagement with the bars, or at least the top of the outer bar which is also provided with a handle portion 66 and is adapted to be swung about the arc indicated by dotted lines in Fig. 3 to permit removal or positioning of the connecting rod 37.

It will be apparent that when the connecting rod is centered about the bar 25 and the parallel bars 59 and 61 arranged at the opposite sides thereof, the springs 64 will draw said parallel bars against said rod. Said bars are of considerable length relative to the width of the connecting rod and, therefore, require no vertical adjustment to enable them to engage the connecting rod in any possible vertical position thereof. Inasmuch as the edges of a rod are often quite irregular, due to the fact that rough castings are ordinarily used for this purpose, the conformable character of the clamping device which I provide is highly important, since the bars are permitted to seek the surfaces which they must engage and to be depressed in any line necessary to finally clamp the rod in proper relationship to the parts of the machine. If it were impossible, as with the ordinary construction, for the clamping members to assume such irregular position as might be necessary for engagement of the irregular surfaces referred to, the rod would either be moved out of alignment to bring its edges into engagement with the clamping members or would be insecurely clamped so that some relative movement thereof would be possible during the boring operation. The inner bar 59 may then be rigidly secured to the bracket arms 53 by means of the set screws 62, and the outer bar may be tightened against the rod by means of thumb screws 67, extending through the flanges 56 of said arms 53. The set screws 62, in the outer bar, may then be tightened and it will be apparent that the rod will then be held immovably during the boring operation, which is very important from the standpoint of the results obtained.

It will be noted that the slot 63, at the top of the outer bar 61, is open so that said bar may be readily disengaged and swung away from the connecting rod after the set screws have been loosened.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. In a boring machine for connecting rod bearings and the like, the combination of a boring tool, means for aligning the connecting rod bearing with respect to said tool, and means for holding the rod rigid and preventing movement thereof during the boring operation, said means comprising a fixed bracket, cooperating parallel bars slidably and pivotally mounted on said bracket, means for adjusting said bars to cause them to firmly engage the connecting rod, and means for fixing the bars rigidly to said bracket after adjustment, intermediate portions of said bars bearing upon the work and the ends thereof being attachable to said bracket.

2. In a boring machine for connecting rod bearings and the like, the combination of a boring tool, means for aligning the connecting rod bearing with respect to said tool, and means for holding the rod rigid and preventing movement thereof during the boring operation, said means comprising a fixed bracket, parallel slotted bars mounted on said bracket, means for arranging the bars in clamping relation to the connecting rod, and means extending through the slots of said bars for rigidly holding the bars in clamping position, intermediate portions of said bars bearing upon the work and the ends thereof being attachable to said bracket.

3. In a boring machine for connecting rod bearings and the like, the combination of a boring tool, means for aligning the connecting rod bearing with respect to said tool, and means for holding the rod rigid and preventing movement thereof during the boring operation, said means comprising a fixed support, parallel bars movably mounted on said support, spring means for drawing said bars toward each other and into clamping relation to the connecting rod, and means for rigidly holding the bars in clamping position, intermediate portions of said bars bearing upon the work and the ends thereof being attachable to said bracket.

4. In a boring machine for connecting rod bearings and the like, the combination of a boring tool, means for aligning the connecting rod bearing with respect to said tool, and means for holding the rod rigid and preventing movement thereof during the boring operation, said means comprising a fixed support, parallel bars movably mounted on said support, spring means for drawing said bars toward each other and into clamping relation to the connecting rod, and means for rigidly holding the bars in clamping position, said spring means being releasably connected with a said bar, intermediate portions of said bars bearing upon the work and the ends thereof being attachable to said bracket.

5. In a boring machine for connecting rod bearings and the like, the combination of a boring tool, means for aligning the connecting rod bearing with respect to said tool, and means for holding the rod rigid and preventing movement thereof during the boring operation, said means comprising a fixed support, parallel bars movably mounted on said support, spring means for drawing said bars toward each other and into clamping relation to the connecting rod and means for rigidly holding the bars in clamping position, said spring means being releasably connected with a said bar and one of the bars being provided with a handle at one end whereby it may be swung away from the connecting rod to permit removal of the latter, intermediate portions of said bars bearing upon the work and the ends thereof being attachable to said bracket.

6. In a boring machine for connecting rod bearings and the like, the combination of a boring tool, means for aligning the connecting rod bearing with respect to said tool, and means for holding the rod rigid and preventing movement thereof during the boring operation, said means comprising a fixed bracket, cooperating parallel bars movably mounted on said bracket, the opposite ends of said bars being adapted to be fixedly clamped to said bracket, means for adjusting said bars to cause them to firmly engage the connecting rod and means for clamping the connecting rod at right angles to the direction of pressure of said bars.

7. In a boring machine for connecting rod bearings and the like, the combination of a boring tool, means for aligning the connecting rod bearings with respect to said tool, and means for holding the rod rigid and preventing movement thereof during the boring operation, said means comprising a rigid support, spaced slotted bars carried by said support and between which the connecting rod is clamped, screws extending through the slots of said bars for securing the latter rigidly to said support after adjustment, and clamping screws mounted in the support and adapted to be tightened against the sides of the rod at right angles to the sides thereof engaged by said bars.

8. In a boring machine for connecting rod bearings and the like, the combination of a boring tool, means for aligning the connecting rod bearings with respect to said tool, and means for holding the rod rigid and preventing movement thereof during the boring operation, said means comprising a bracket rigidly attachable to the frame of the boring machine, parallel bars having a bolt and slot connection with said bracket, spring means for drawing the bars together to cause them to clamp the connecting rod therebetween, and an adjusting screw for tightening the bars against said rod, intermediate portions of said bars bearing upon the work and the ends thereof being attachable to said bracket.

9. In a boring machine for connecting rod bearings and the like, the combination of a frame, boring mechanism, and means for supporting the connecting rod in desired relationship to said boring mechanism, said means comprising a bracket fixed to the frame, a clamping device carried by said bracket and including a pair of relatively long, thin bars slotted at their upper and lower ends and freely slidable at both ends upon said bracket to enable them to conform to the edges of the connecting rod irrespective of irregularities in the latter, spring connections between said bars at both the upper and lower ends thereof whereby when the bars are arranged on the opposite sides of the connecting rod and spring connected they seek the surfaces of the connecting rod and accommodate themselves thereto, and means for clamping said bars in the positions assumed thereby irrespective of irregular disposition thereof, intermediate portions of said bars bearing upon the work and the ends thereof being attachable to said brackets.

10. In a boring machine for connecting rod bearings and the like, the combination of a frame, boring mechanism, and means for supporting the connecting rod in desired relationship to said boring mechanism, said means comprising a bracket fixed to the frame, a clamping device carried by said bracket and including a pair of relatively long, thin bars slotted at their upper and lower ends and freely slidable at both ends upon said bracket to enable them to conform to the edges of the connecting rod irrespective of irregularities in the latter, spring connections between said bars at both the upper and lower ends thereof whereby when the bars are arranged on the opposite sides of the connecting rod and spring connected they seek the surfaces of the connecting rod and accommodate themselves thereto, means for clamping said bars in the positions assumed thereby irrespective of irregular disposition thereof, and clamping members adapted to engage opposite portions of the connecting rod on planes at substantially right angles to the points of engagement of said connecting rod by said bars.

11. In a boring machine for connecting rod bearings and the like, the combination of a frame, boring mechanism, and means for supporting the connecting rod in desired relationship to said boring mechanism, said means comprising a bracket fixed to the frame, a clamping device carried by said bracket and including a pair of relatively long, thin bars slotted at their upper and lower ends and freely slidable at both ends upon said bracket to enable them to conform to the edges of the connecting rod irrespective of irregularities in the latter, spring connections between said bars at both the upper and lower ends thereof whereby when the bars are arranged on the opposite sides of the connecting rod and spring connected they seek the surfaces of the connecting rod and accommodate themselves thereto, means for clamping said bars in the positions assumed thereby irrespective of irregular disposition thereof, and means for tightening one of said bars against the connecting rod after the other thereof has been fixed in final position, intermediate portions of said bars bearing upon the work and the ends thereof being attachable to said bracket.

12. In a boring machine for connecting rod bearings, the combination of a frame, boring mechanism with respect to which the head of the rod is mounted to permit operation of the tool upon the bearing in said head, supporting means for the wrist pin end of the rod, and a clamping device adapted to be moved into engagement with the opposite side edges of the rod and to accommodate itself to the plane of said edges, said means comprising fixed supporting members arranged respectively above and below the rod position, and a pair of parallel, slotted, spring-connected bars secured at their opposite ends to said supporting members respectively, said bars being yieldingly drawn towards each other and into proper conformation to the rod, and means for rigidly clamping both of said bars to said supporting members after they have assumed proper relation to the rod.

WILLIAM STANLEY GREEN.